United States Patent [19]
Becherucci et al.

[11] Patent Number: 6,070,826
[45] Date of Patent: Jun. 6, 2000

[54] ARMATURE WINDER SHROUD CHANGING APPARATUSES AND METHODS

[75] Inventors: Raffaele Becherucci, Scandicci; Antonio Randazzo, Venice; Antonio Lumini, Florence, all of Italy

[73] Assignee: Axis USA, Inc., Tampa, Fla.

[21] Appl. No.: 09/056,159

[22] Filed: Apr. 6, 1998

Related U.S. Application Data

[60] Provisional application No. 60/060,016, Sep. 25, 1997, and provisional application No. 60/068,397, Dec. 22, 1997.

[51] Int. Cl.[7] .................................................. H02K 15/09
[52] U.S. Cl. ........................................................ 242/433.4
[58] Field of Search ................................ 242/433.4, 448; 29/596, 605

[56] References Cited

U.S. PATENT DOCUMENTS

| | | | |
|---|---|---|---|
| 3,685,119 | 8/1972 | Geber | ..................................... 29/205 D |
| 4,786,004 | 11/1988 | Boers . | |
| 4,974,313 | 12/1990 | Reiger et al. | ..................... 242/433.4 X |
| 5,257,745 | 11/1993 | Lombardi . | |
| 5,383,620 | 1/1995 | Lombardi et al. . | |
| 5,799,896 | 9/1998 | Luciani et al. | ........................ 242/433.4 |

FOREIGN PATENT DOCUMENTS

| | | |
|---|---|---|
| 0 334 816 B1 | 6/1993 | European Pat. Off. . |
| 0 332 589 B1 | 6/1994 | European Pat. Off. . |

*Primary Examiner*—Donald P. Walsh
*Assistant Examiner*—Emmanuel M. Marcelo
*Attorney, Agent, or Firm*—Fish & Neave; Robert R. Jackson; James A. Leiz

[57] ABSTRACT

Armature winders which include a mounting apparatus, a holder assembly and a transporting apparatus and methods for shroud changing. The mounting apparatus is used for mounting the shroud on a support structure so that the shroud is held firmly relative to the support structure but is also readily removable from the support structure. The holder assembly holds the shroud and any replacement shroud when not in use. The transporting apparatus transports the shroud in either direction to and from the mounting apparatus and the holder assembly.

18 Claims, 8 Drawing Sheets

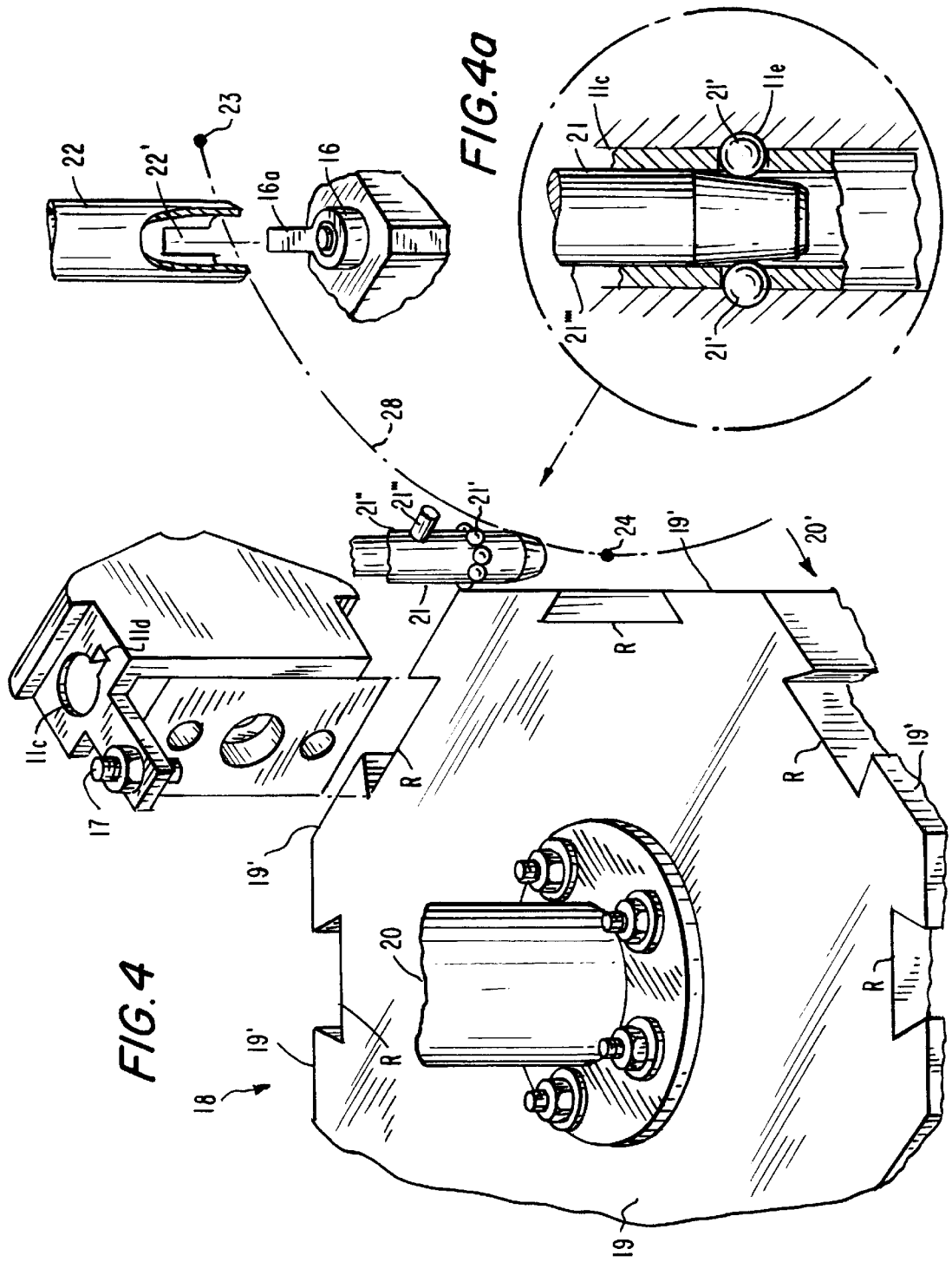

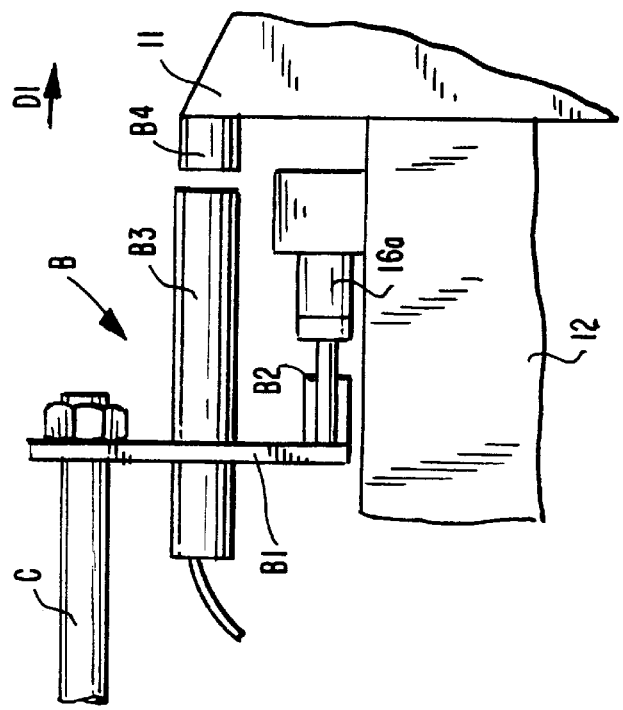
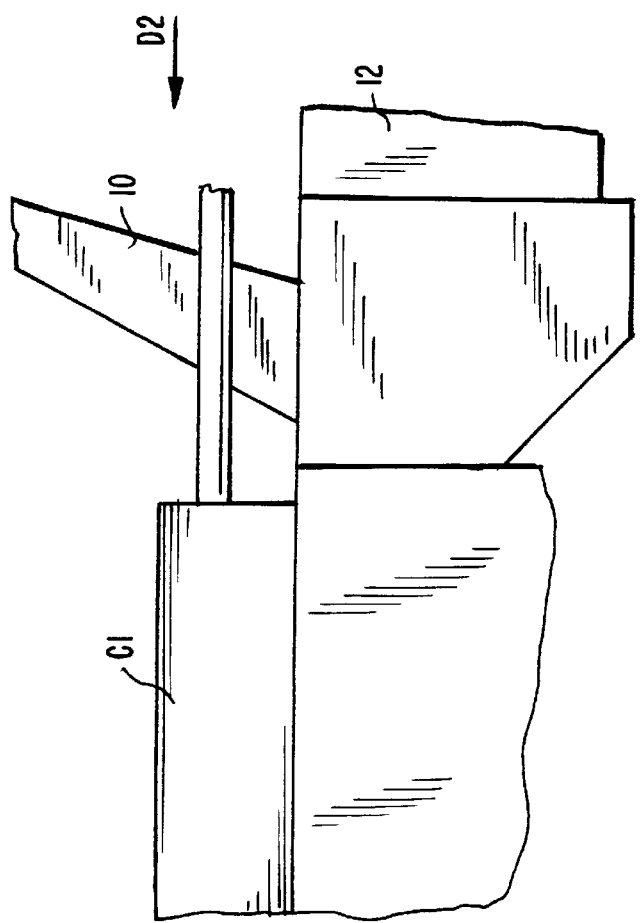

ARMATURE WINDER SHROUD CHANGING APPARATUSES AND METHODS

This application claims the benefit of U.S. provisional patent applications No. 60/060,016 and No. 60/068,397, filed Sep. 25, 1997 and Dec. 22, 1997, respectively.

BACKGROUND OF THE INVENTION

This invention relates to apparatuses and methods for automatically changing the winding guides (herein after referred to as shrouds) needed in winders for winding coils in armatures. Winders of this type having shrouds which can be rapidly changed have been presented in Boers, U.S. Pat. No. 4,786,004, Armature Winding Machine With Removable Shrouds and in Lombardi et al., U.S. Pat. No. 5,257,745, Apparatus For Facilitating The Changing Of Shrouds In Armature Winding Machines, both of which are incorporated herein by reference.

The shrouds are needed in these winders to guide wire into the slots of the lamination stack of the armature as it is being dispensed from a rotating flyer. The shrouds need to be changed at least whenever there is a variation in the diameter or in height of the lamination stack belonging to the armature to be wound.

In view of the foregoing, it would be desirable to provide a winder which can successively wind different types of armatures by easily changing the shrouds.

SUMMARY OF THE INVENTION

It is an object of the present invention to provide winders and methods which can successively wind different types of armatures by easily changing the shrouds.

These and other objects are accomplished by providing armature winders which include a mounting apparatus, a holder assembly and a transporting apparatus and methods for shroud changing. The mounting apparatus is used for mounting the shroud on a support structure so that the shroud is held firmly relative to the support structure but is also readily removable from the support structure. The holder assembly holds the shroud and any replacement shroud when not in use. The transporting apparatus transports the shroud in either direction to and from the mounting apparatus and the holder assembly.

BRIEF DESCRIPTION OF THE DRAWINGS

The above and other objects and advantages of the invention will be apparent upon consideration of the following detailed description, taken in conjunction with the accompanying drawings, in which like characters refer to like parts throughout and in which:

FIG. 4 is a schematic and perspective view from direction 4—4 of FIG. 1 showing an assembly which includes a platform having a polygon configuration;

FIG. 4a is an enlarged section view of the lower end of the pick up tube inserted in a bore in the shroud;

FIGS. 5a and 5b are views from 5—5 of FIG. 1 showing an alternate embodiment for actuating a shroud clamp;

DETAILED DESCRIPTION

Figure 1:
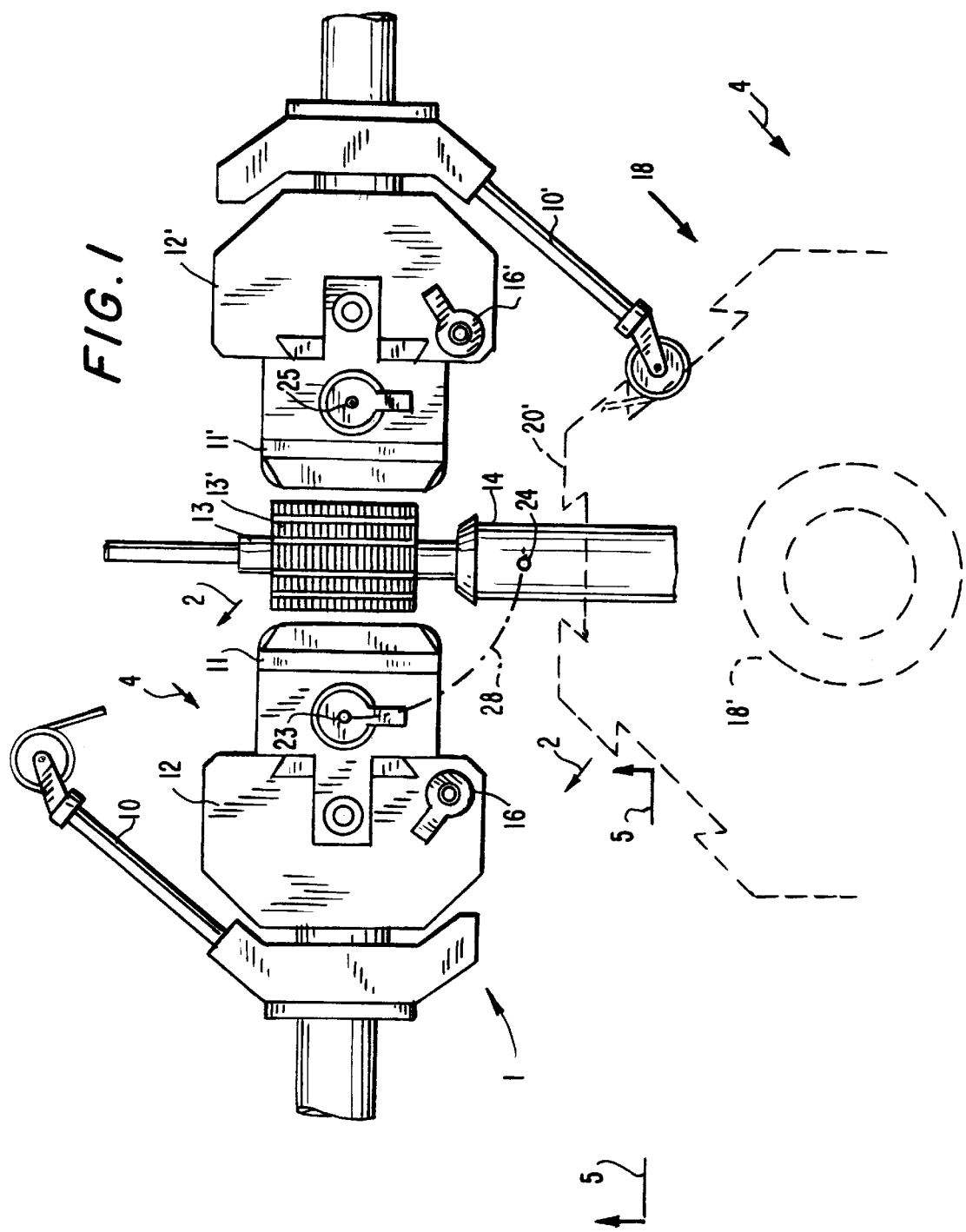
FIG. 1 is a plan view of the armature winder according to the invention.

FIG. 1 is a plan view of a winder 1 according to the invention, showing flyers 10 and 10' for delivering the wire to wind the coils, shrouds 11 and 11' opposite to each other for guiding the wires, support structures 12, 12' respectively for holding shrouds 11 and 11', armature 13 positioned between the shrouds during winding and collet assembly 14 for holding the armature between the shrouds during winding.

Figure 2:
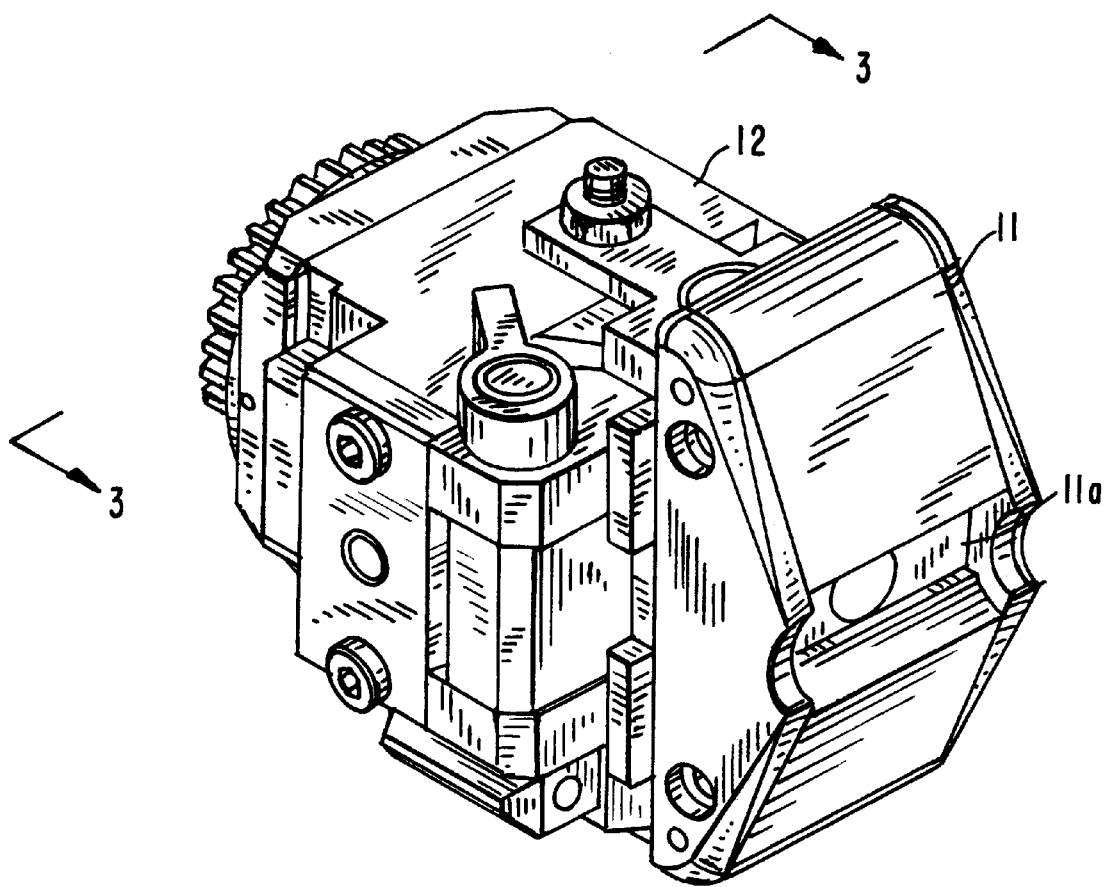
FIG. 2 is a view from direction 2—2 of FIG. 1 which shows one of the two oppositely positioned shrouds locked in place on the support structure of the winder.

FIG. 2 (which is a view from direction 2—2 of FIG. 1) shows one of the two oppositely positioned shrouds (shroud 11) locked in place on support structure 12 of the winder 1 and positioned to guide wire from rotating flyer 10 (not shown in FIG. 2). For sake of clarity, the armature 13 has not been shown in FIG. 2. The lamination stack 13' of the armature needs to be positioned in seat 11a of the shroud in order to receive wire from respective flyer 10 during winding.

Figure 3:
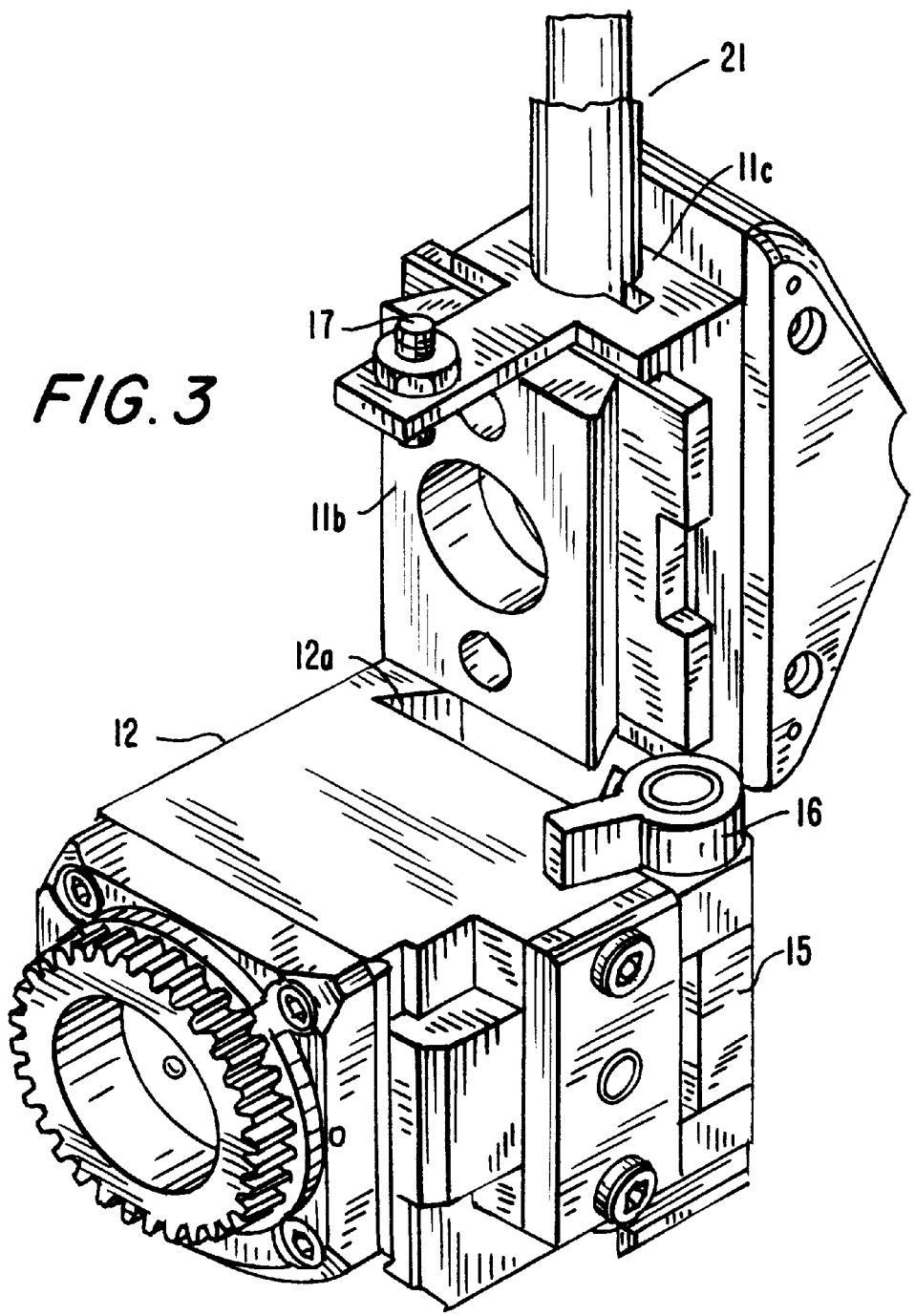
FIG. 3 is a view from 3—3 of FIG. 2 showing a shroud which has been removed from the support structure.

FIG. 3 is a view from 3—3 of FIG. 2 showing shroud 11 which has been removed from the support structure 12 for replacement by another shroud 11 to suit the lamination stack being wound. As shown in FIG. 3, the shroud 11 is provided with a key 11b configured like a dove tail which slides freely into aligned slot 12a of the support structure 12. Slot 12a is provided with a matching dove tail configuration. When actuated, clamp 15 recovers any play existing between key 11b and slot 12a (when key 11b is fully inserted in slot 12a) to firmly lock the shroud 11 in position with respect to the support structure 12, as is required for winding of the coils by rotation of the flyer 10. Handle 16 needs to be turned to actuate clamp 15 and cause the shroud 11 to be unlocked and free to be removed from the support structure by sliding key 11b upwardly and out of slot 12a (the condition shown in FIG. 3). Flyer 10 (shown in FIG. 1) needs to be positioned so as not to interfere with the shroud changing process. When the shroud 11 is mounted on the support structure 12 (i.e., key 11b is fully inserted in slot 12a) stop screw 17 (which is part of the shroud 11) abuts against the upper face of support structure 12.

To remove the shroud 11 from the winder 1 and to substitute it with another shroud required for winding a differently configured armature 13, holder assembly 18 (shown in FIGS. 1 and 4) is provided in area 18' above the winder 1.

FIG. 4 is a schematic and perspective view from direction 4—4 of FIG. 1. As shown in FIG. 4, holder assembly 18 comprises a platform 19 having a polygon configuration with a plurality of faces 19'. The platform 19 is capable of rotating around axis 20 to present in succession its faces 19' on vertical plane 20'.

Each of the faces 19' has respective vertical receiving slots R, open at the upward end and similar to slot 12a of support structure 12. These receiving slots R are capable of receiving key 11b of the shrouds 11 as will be fully described herein.

In FIG. 4, one of the faces 19' is shown with a shroud 11 having dovetail key 11b aligned with the respective receiving slot R. This representation shows the alignment as it would appear to make the dovetail key 11b slide into the receiving slot, however, the face would be in plane 20' to achieve this operation, as will be described in the following.

For sake of clarity, only a portion of platform 19 having five faces 19' has been shown in FIG. 4 and shrouds 11 which are stored on the faces 19' have not been shown.

A transporting apparatus, which includes a pick up tube 21, is capable of moving on circumference 28 so that it can move between alignment over the dovetail key portion 11b of the shroud 11 (point 23), where the latter is coupled to the support structure 12 of the winder 1 and above point 24, where the pick up tube 21 will be in alignment over the same dove tail key portion 11b when a shroud 11 is held on a face 19' aligned on vertical plane 20'. An overhead rotating arm mechanism for accomplishing this movement of the pick up tube 21 and others of this same member, which will be described in the following, has not been shown for sake of clarity.

Pick up tube 21 is provided with balls 21' protruding from bores located on an external tube 21". More precisely, the balls 21' are placed on a circumference of the lower end of external tube 21" and extend from openings positioned on this circumference. The dovetail portion of the shrouds 11 is provided with a vertical extending bore 11c which can receive the lower portion of the external tube 21", as shown in FIG. 4a (which is an enlarged sectional view of the lower end of the pick up tube 21 inserted in bore 11c). Also present on the lower portion of external tube 21" is a radial pin 21'". Bore 11c has a vertical groove lid for receiving radial pin 21'".

The pick up tube 21 needs to be aligned with the bore 11c (i.e., external tube 21" is aligned with the bore 11c and pin 21'" is aligned with groove 11d) and then lowered to such an extent that the balls 21' become aligned with a circumferential groove 11e inside the bore 11c (see FIGS. 3 and 4a). An actuating rod 21"" within external tube 21" can then be driven downwards to force the balls 21' into engagement with the surface of the circumferential groove 11e. This provides coupling between the pick up tube 21 and the shroud 11 so that the latter can be lifted, lowered and transported to required positions by movement of the pick up tube 21.

During movement of the pick up tube 21, the engagement of radial pin 21'" in vertical grove lid avoids rotation of the shroud 11 around the pick up tube 21. Therefore, coupling by using the balls 21' and the radial pin 21'" guarantees that the shroud 11 is correctly positioned with respect to the pick up tube 21. To remove the shroud 11 from the support structure 12 of the winder 1, the pick up tube 21 is aligned with bore 11c of the shroud 11 which is locked on the support structure 12. To do this, pick up tube 21 is moved to point 23. The coupling of the pick up tube 21 with the shroud 11 at point 23 occurs by moving the pick up tube 21 downwardly to make the balls 21' engage the groove of bore 11c and to insert pin 21'" in groove lid. The actuating rod 21"" is also driven downwardly to secure the connection.

Once the pick up tube 21 has been coupled to the shroud 11, key tube 22 engages handle 16 to actuate clamp 15. More precisely, the engagement of key tube 22 with the handle 16 is obtained by lowering the key tube 22 over the handle 16 and engaging slot 22', present on the key tube 22, with an extension 16a of the handle 16. Then, after the clamp 15 has been released, the pick up tube 21 is lifted to make the dovetail key 11b of the shroud 11 move out of slot 12a to reach the position shown in FIG. 3, which is such that the entire body of the shroud 11 has sufficiently cleared any surrounding structure of the winder 1. Then, the pick up tube 21 with the shroud 11 coupled to it can move on circumference 28 (circumference 28 represents the travel of a point of external tube 21") to point 24 in order to bring the dovetail key of the shroud 11 into alignment with a receiving slot R of the face 19' of the platform 19 positioned on plane 20'.

Once this alignment has been reached, the pick up tube 21 can be lowered to lower the dovetail key of the shroud 11 in the receiving slot R until stop screw 17 abuts against a reference surface on the upper face of the platform 19. In this way, the shroud 11 is positioned and can be held with respect to the face 19' of the platform 19. Then actuating rod 21"" within the pick up tube 21 is released to disengage the balls 21' from grove 11e.

Following this disengagement, the pick up tube 21, now free of the shroud 11, is lifted to allow rotation of the platform 19 in order to present another face 19' on vertical plane 20'. This other face 19' will have a new shroud which needs to be placed in the winder 1 for winding a newly configured armature 13 in place of the shroud 11 which has just been removed and placed on the platform 19. When this other face 19' is aligned on vertical plane 20', pick up tube 21 is lowered at point 24 to couple with the new shroud by means of bore 11c, the balls 21' and the radial pin 21'". Once this coupling has been achieved, the pick up tube 21 is raised to remove the new shroud from the platform 19 and then moved backwards along circumference 28 to point 23 in order to align the dovetail portion of the new shroud with slot 12a of the support structure 12. After this alignment has been achieved at point 23, the pick up tube 21 is lowered to insert the dove tail key 11b of the new shroud into slot 12a. Clamp 15 is opened by key tube 22 just prior to this movement and is kept open until abutment of stop screw 17 occurs against the upper face of the support structure 12. Then, key tube 22 is turned again to cause the clamp 15 to lock the new shroud in the required winding position.

Pick up tube 21 and the key tube 22 are then lifted and moved into alignment with the shroud 11 on the opposite side of the winder 1 to repeat the operations described above in order to substitute the opposite shroud 11' with another shroud present on platform 19, required for winding the newly configured armature 13.

Pick up tube 21 and key tube 22 can move on a continuation of the circumference 28 defined by portion between points 23 and 24, respectively, to become aligned with a bore like 11c present on the opposite shroud 11' and with a handle 16' present on the opposite support structure 12'.

To exchange shroud 11' with a new shroud stored on the platform 19, pick up tube 21 will move between points 25 and 24 and repeat the operations which have been described above.

In FIG. 4, platform 19 has been shown with an unlimited number of faces 19', therefore with an unlimited number of sets of shrouds 11, 11' (one set including two opposite shrouds 11, 11' which need to be present in the winder 1 for winding a specific armature 13 configuration) which can be exchanged with the set present in the winder 1 when conversion is required. A particular way for achieving the automatic change is to have on platform 19 only one set of shrouds which need to be exchanged with those present in the winder 1. In this case, platform 19 needs only four faces 19' (two faces 19' with the shrouds of a replacement set and two faces 19' with free slots R to receive the shrouds which are present in the winder 1). In such an embodiment, the line operator must assure that platform 19 has the needed set of shrouds before the automatic change is to occur. The operator can prepare the change of the shrouds (by placing on platform 19 the correct set of shrouds which are required for the next armature configuration to be wound) when the winder 1 is still employed in winding a current armature configuration. Then, at a future time when the actual conversion of the winder 1 is required, a simple command signal to the controls may be used to control the operations previously described to facilitate the automatic change of the shrouds.

Key tube 22, described above, is just one of many possible ways of actuating clamp 15. FIGS. 5a and 5b, corresponding to views from direction 5—5 of FIG. 1, illustrate an alternative solution for extension 16a of handle 16 to actuate clamp 15. FIG. 5b is a continuation of the right portion of FIG. 5a, although on a smaller scale.

With reference to FIG. 5a, extension 16a is shown extended to the center of support structure 12 so that it can be aligned with a push structure B connected to the end of a cylinder rod C.

Push structure B includes a vertical bracket B1 which carries a follower wheel B2. When cylinder rod C is extended, as shown in FIG. 5a, follower wheel B2 engages extension 16a and pushes it in direction D1 to open clamp 15. Bracket B1 also carries three proximity sensors B3 substantially aligned in a horizontal plane. Only one of sensors B3 can be seen in FIG. 5a. The other sensors are hidden by the sensor that can be seen.

Shroud 11 has studs B4 that can be read by proximity sensors B3 to identify the shroud that has been mounted on support 12. The presence or absence of a stud at a particular proximity sensor B3 is a source of information for the reading of the shroud identification.

In FIG. 5b, cylinder C1 is shown mounted on the support structure of flyer 10. To clamp shroud 11 to structure 12, cylinder rod C is retracted in direction D2 to pull push structure B out of the way with respect to the orbit of the flyer rotation.

A new shroud is identified as soon as it is placed in groove 12a of support structure 12. If a wrong shroud has been placed on support structure 12, further operations of the winder are interrupted, and the operator is alerted to intervene.

Figure 6:
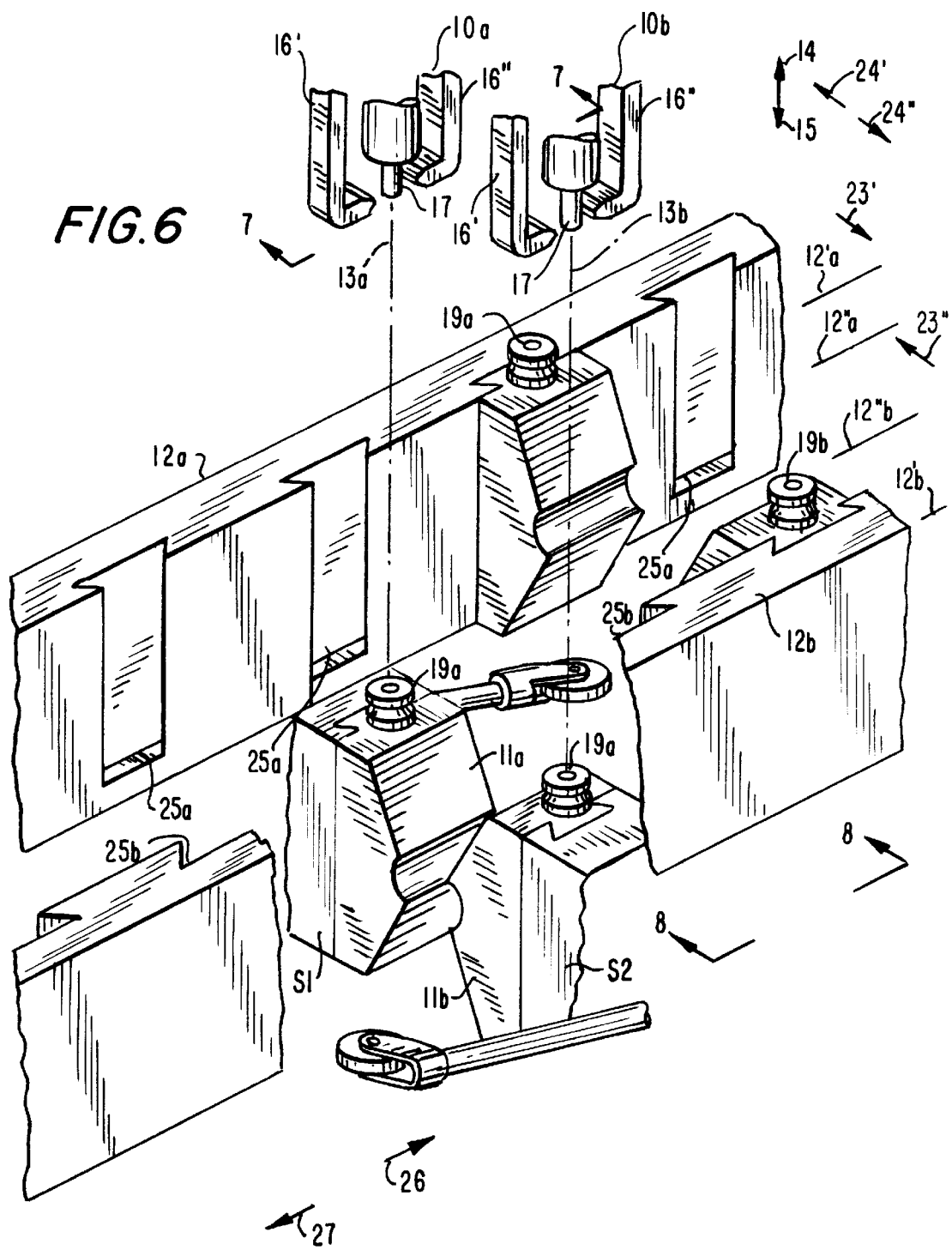
FIG. 6 is a perspective view of an alternative embodiment of a device for changing the shrouds in an armature winder.

FIG. 6 is a perspective view of an alternative embodiment of a device for changing the shrouds in an armature winder. This device is capable of removing and replacing both of the shrouds that are required by the winder. The solution used to couple the shrouds to the support structure of the winder is the same as that of the previous embodiment, i.e. a slide of the shroud is received by a groove of the support structure and a locking device or clamp is present to secure the shroud in place once it has reached its definite position for winding.

With reference to FIG. 6, the device is provided with a transporting apparatus which includes two gripper members 10a and 10b for removing respectively shrouds 11a and 11b from the support structure of the winder and for replacing them with a new set of shrouds.

Gripper members 10a and 10b are permanently aligned on axes 13a and 13b, respectively, to move at required times upwards (in vertical direction 14) and downwards (in vertical direction 15).

Each gripper member is provided with a pair of tongs 16' and 16" and a vertical pin 17 (see also FIG. 7, which is a partial fragmentary view from 7—7 of FIG. 6) for correctly grasping and releasing the shrouds. The tongs are capable of moving in horizontal directions 20 to be opened (i.e. symmetrically moved apart) and in direction 21 to be closed (i.e. symmetrically brought near to each other).

The shrouds 11a and 11b have on their upper side protrusions 19a and 19b, respectively, each provided with a circumferential niche 22' and vertical bore 23. The alignment on axes 13a and 13b of the gripper members, aligns the pin 17 with vertical bore 23.

Figure 7:
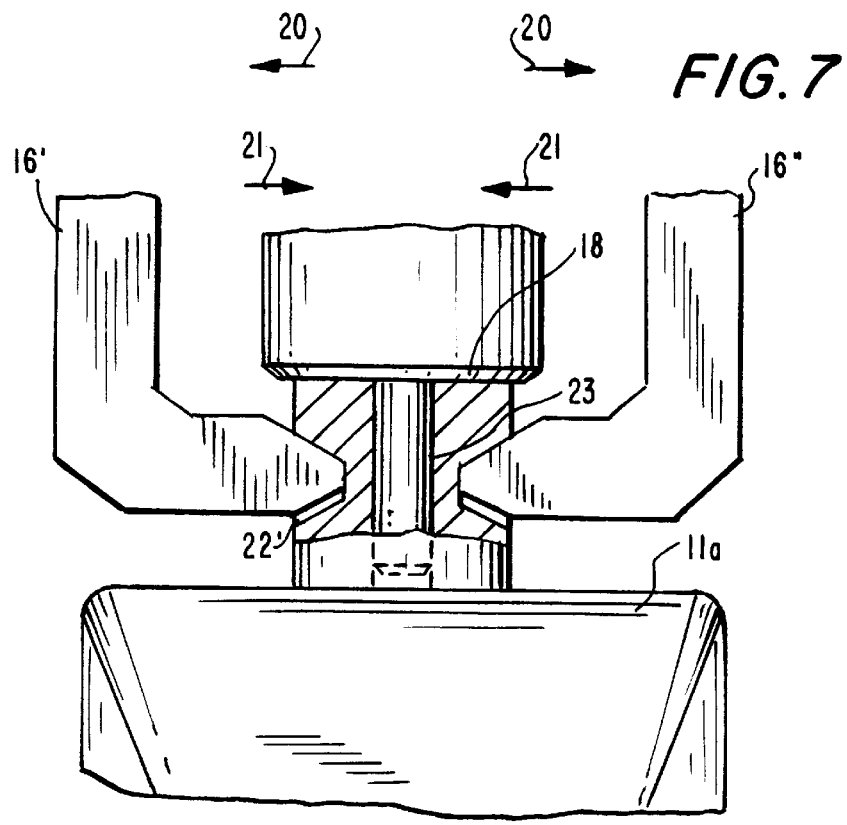
FIG. 7 is a partial fragmentary view from 7—7 of FIG. 6.

To remove the shrouds from the winder, the gripper members are moved from their rest position shown in FIG. 6, downwards in direction 15, with the tongs open. At the end of this movement the tongs are aligned with the niche, and pin 17 is inserted in vertical bore 23 (this condition is shown in FIG. 7). Immediately afterwards, the locking device of the shroud is released, as has been shown for the previous embodiment. Once this released condition has been reached, the tongs are closed to bring their tip portions into engagement with the upper slanted surface of the niche. This operation pulls the shroud against reference surface 18 of the gripper member to achieve correct positioning with respect to the gripper member. There is also co-operation of vertical pin 17, which is accurately located in bore 23 to achieve the correct positioning.

Once the tongs have grasped the shroud, by being closed onto the protrusions, the gripper members can be raised in direction 14 to reach their rest position (where they are shown in FIG. 6). Now, the shrouds can be deposited in a storing device (e.g., a holder assembly) and substitute shrouds can be placed back in the winder.

The storing device 12 consists of spaced apart arms 12a and 12b that can move (translate) in directions 23' and 23" to be shifted from respective axis 12'a to axis 12"a (for arm 12a) and from respective axis 12'b to axis 12"b (for arm 12b). Directions 24' and 24" can be used to move the arms back to axes 12'a, 12'b.

Arms 12a and 12b are provided with grooves spaced at equal distances from each other (grooves 25a for arm 12a and grooves 25b for arm 12b). Each groove of one arm is opposite to a groove of the other arm. The grooves have the purpose of receiving and maintaining in a required position the shrouds, which are transferred by gripper members 10a and 10b to and from the winder. Gripper member 10a exchanges shrouds between arm 12a and support S1 of the winder, whilst gripper member 10b exchanges shrouds between arm 12b and support S2. The grooves of the two arms, which are opposite to each other, receive shrouds that are required at the same time by the winder for winding a specific armature configuration.

When gripper members 10a and 10b are removing a set of shrouds from the winder, arms 12a and 12b are positioned on axes 12'a and 12'b, respectively, to allow gripper members 10a and 10b to accomplish the described movements in directions 14 and 15 along axes 13a and 13b.

The arms are moved to axes 12"a and 12"b when shrouds of the storing device have to be transferred by the gripper members to the winder. The arms are moved to this position only when the gripper arms have been moved to their rest position after having grasped their respective shrouds. The rest positions are such that the arms are below the shrouds being held by the gripper members. Also, by moving arms 12a and 12b respectively on axes 12"a and 12"b in directions 26 and 27 that are parallel to axes 12'a and 12"b, grooves 25a and 25b can be aligned with the slide of the shrouds being held by the gripper members. More precisely, a required groove of arm 12a can be aligned with the slide of a shroud being held by gripper member 10a, and an opposite required groove of arm 12b can be aligned with the slide of a shroud held by gripper member 10b.

For sake of clarity, in FIG. 6 many of the grooves have been shown in a condition in which they are not receiving slides of the shrouds that need to be exchanged with the winder. In reality, all the grooves except an opposite pair, will have shrouds, which need to be exchanged with the winder. To receive shrouds from the gripper members, the pair of grooves that are empty will be positioned by movement in either direction 26 or 27 of the arms, to align them with the slides of the shrouds that are being held by gripper members 10a and 10b.

Then, gripper members will descend along axes 13a and 13b to deposit the shrouds on arms 12a and 12b, thereby causing the slides of the shrouds that they are holding to be received in the empty grooves that have been previously aligned. Following this, gripper members 10a and 10b are raised to their rest position after having deposited the shrouds on arms 12a and 12b by opening tongs 16' and 16"

Then, the arms can be moved in either direction 26 or 27 to bring a required pair of shrouds in alignment with gripper members 10a and 10b. This will allow the open tongs of the gripper members to become aligned with protrusions 19a and 19b of the required pair of shrouds. Gripper members can then be lowered again to grip the required shrouds, and immediately afterwards to rise again to bring the shrouds to the rest positions. Once the rest positions have been reached, arms 10a and 10b are moved in directions 24 to reach axes 12'a and 12'b. This position brings the arms out of the way to allow descent along axes 13a and 13b of the gripper members in order to position the required shrouds on the winder.

Figure 8:
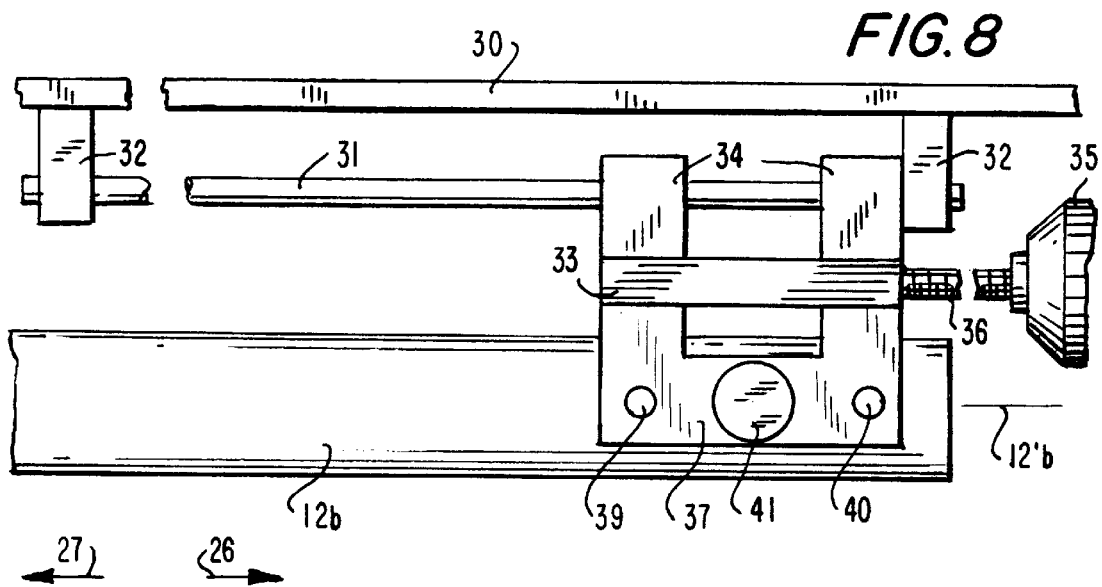
FIG. 8 is a view from 8—8 of FIG. 6.
Figure 9:
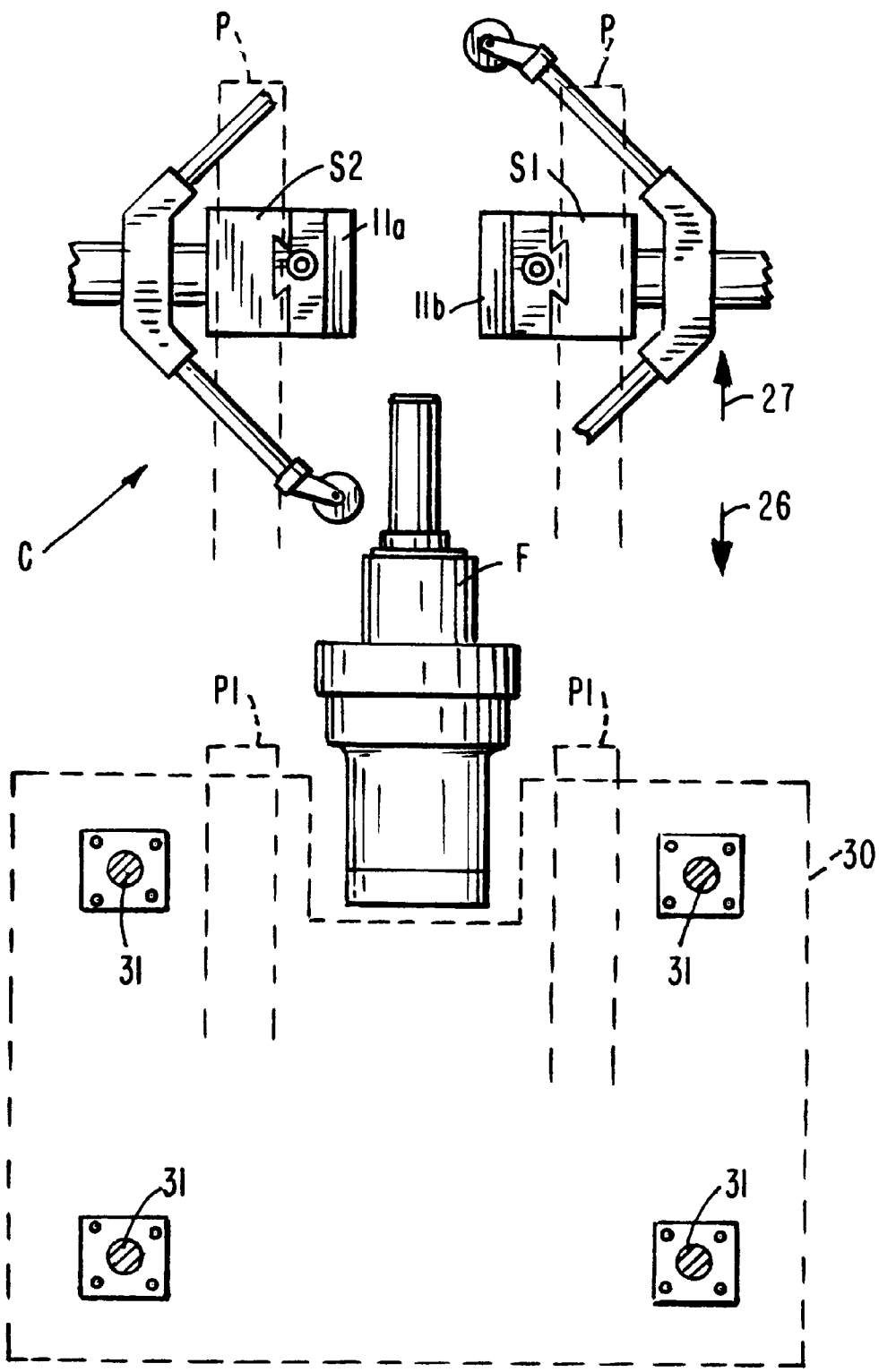
FIG. 9 is a plan view which shows a layout of the main components present in the winder.

FIG. 8 is a view from 8—8 of FIG. 6 showing in schematic form the devices for moving arms 12a and 12b in directions 23, 24, 26 and 27. FIG. 9 is a plan view which shows a layout of the main components present in the winder.

Support plate 30 extends horizontally (above the components of the winder) by being supported on vertical columns 31 (shown in section view in FIG. 9) upstanding vertically from the base of the winder. The contour of support plate 30 has been shown by a dashed line representation in FIG. 9. Assembly F shown in FIG. 9 is an index device for holding and rotating the armature during the various stages of a winding operation.

With reference to FIG. 8, spaced apart longitudinal guides 31 are fixed to plate 30 by means of supports 32. Guides 31 extend parallel to axes 12'a and 12'b. Carriage plate 33 can run along guides 31 by means of slides 34 to move in either direction 26 or 27. Programmable motor 35 with turn screw 36 can be used to move the carriage plate in directions 26 or 27. Lower plates 37 and 38 are fixed to carriage plate 33. The lower plates are opposite to each other and at each side of carriage plate 33, thus only plate 37 can be seen in FIG. 8. Guide bars 39 and 40, for supporting arms 12a and 12b have their ends fixed to plates 37 and 38. Guide bars 39 and 40 extend perpendicularly to plates 36 and 37. Air cylinder 41 and 42 are fixed respectively to plates 36 and 37. Only the rear end of cylinder 41 can be seen in FIG. 8. Cylinder 42 (not shown) is directly opposite to cylinder 41. The rod of cylinder 41 is connected to arm 12b, whilst the rod of cylinder 42 is connected to arm 12a. By supplying pressurised air to one side of cylinders 41 and 42, arms 12a and 12 b will be moved in directions 23 (from axis 12'a to axis 12"a—for arm 12a, and from axis 12'b to axis 12'b—for arm 12b). Supply of pressurised air to the other sides of the cylinders will cause movement in directions 24 to return the arms to axes 12'a and 12'b.

Motor 35 is controlled by control unit (not shown) to rotate for predetermined numbers of turns that correspond to the position which the arms must reach on axes 12'a, 12'b, 12"a and 12"b. This will position a pair of required grooves in alignment with gripper members 10a and 10b to allow delivery of shrouds or to receive them, as has been described in the foregoing. The control unit has a memory for storing the positions that opposite grooves of the arms need to reach by means of the motor turning. These positions are basically the number of turns that the motor has to accomplish to position the grooves. The control unit also associates individual grooves with the specific shroud set that they have received or with the condition that they do not have shrouds, for the reasons described in the foregoing.

FIG. 9 also shows the position which the arms have when they are moved in direction 27 to align shrouds with the gripper members (position P of the dashed line representation) and the position reached when they have been retracted in direction 26 (position P1 of the dashed line representation) to clear the central area C of the winder, as needs to be done to create room for possible intervention by a human operator. The control unit has information to make the motor turn for the required number of turns to reach the retracted position represented by P1.

These principles contribute to reducing the conversion time which is required for changing an armature line from processing one armature type to another. Furthermore, the burden on the line operator to achieve the conversion is reduced.

One skilled in the art will appreciate that the present invention can be practiced by other than the described embodiments, which are presented for purposes of illustration and not of limitation, and the present invention is limited only by the claims which follow.

What is claimed is:

1. An armature winder comprising:
    a mounting apparatus for mounting a shroud which guides wire into the slots of an armature on a support structure so that said shroud is held firmly relative to said support structure but is also readily removable from said support structure;
    a holder assembly for holding said shroud when not in use; and
    a transporting apparatus for transporting said shroud to and from said mounting apparatus and said holder assembly.

2. The armature winder of claim 1 further comprising:
    a flyer for rotatingly dispensing wire onto an armature positioned to receive said wire, said flyer positioned on said mounting apparatus.

3. The armature winder of claim 1 wherein said mounting apparatus further comprises a clamp to secure said shroud to said mounting apparatus for winding.

4. The armature winder of claim 3 wherein said shroud is slidably mounted on said mounting apparatus.

5. The armature winder of claim 3 wherein said shroud is vertically slidably mounted on said mounting apparatus.

6. A method for changing a shroud which guides wire into the slots of an armature for use with an armature winder comprising:
    mounting said shroud on a support structure so that said shroud is held firmly relative to said support structure but is also readily removable from said support structure;
    transporting said shroud to and from said support structure and a holder assembly; and
    receiving said shroud in said holder assembly.

7. An armature winder comprising:

a pair of mounting apparatuses for respectively mounting a pair of shrouds which guide wire into the slots of an armature on a pair of support structures so that each shroud is held firmly relative to its respective support structure but is also readily removable from its respective support structure;

a pair of holder assemblies for respectively holding said pair of shrouds when not in use; and a transporting apparatus for transporting each shroud to and from its respective support structure and respective holder assembly.

8. The armature winder of claim 7 further comprising:

a pair of flyers for rotatingly dispensing wire onto an armature positioned to receive said wire, each of said pair of flyers positioned respectively on a respective one of said pair of mounting apparatuses.

9. The armature winder of claim 7 wherein each of said pair of mounting apparatuses further comprises a clamp to secure said shroud for winding.

10. The armature winder of claim 9 wherein each of said shrouds is slidably mounted respectively on a respective one of said pair of mounting apparatuses.

11. The armature winder of claim 9 wherein said shrouds are vertically slidably mounted on respective ones of said pair of mounting apparatuses.

12. A method for changing a shroud for use with an armature winder comprising:

mounting a pair of shrouds which guide wire into the slots of an armature respectively on a pair of support structures so that each of said pair of shrouds is held firmly relative to its respective support structure but is also readily removable from its respective support structure;

transporting each of said pair of shrouds to and from its respective support structure and a respective holder assembly; and receiving each of said pair of shrouds in its respective holder assembly.

13. An armature winder comprising:

a pair of flyer winders, each having a flyer arm rotatable about a winding axis which is common to both flyer winders;

a structure for positioning an armature to be wound between the flyer winders;

a support structure associated with at least one of the flyer winders for removably supporting a shroud in an operative position between the flyer winder and the armature, the support structure being configured to removably receive the shroud by motion of the shroud along an axis which is not parallel to the winding axis; and a transporting apparatus for moving the shroud between a position remote from the flyer winders, where the shroud is not in use, and the operative position by causing movement of the shroud which includes said motion.

14. The armature winder of claim 13 wherein the support structure associated with at least one of the flyer winders further comprises a clamp to secure said shroud for winding the armature.

15. The armature winder of claim 13 wherein the shroud is removably received vertically by the support structure associated with at least one of the flyer winders.

16. The armature winder of claim 13 wherein the support structure is one of a pair of support structures for respectively removably supporting a pair of shrouds in an operative position between the flyer winders and the armature, the pair of support structures being configured to respectively removably receive the pair of shrouds by motion of each shroud along an axis which is not parallel to the winding axis, and wherein the transporting apparatus is adapted for moving each shroud between a position remote from the flyer winders, where each shroud is not in use, and the operative position by causing movement of each shroud which includes said motion.

17. The armature winder of claim 16 wherein each of said pair of support structures further comprises a clamp to secure its respective shroud for winding.

18. The armature winder of claim 16 wherein said pair of shrouds are removably received vertically by the respective said pair of support structures.

* * * * *